United States Patent [19]

Zarkadas

[11] 4,041,451
[45] Aug. 9, 1977

[54] CIRCUIT FOR MONITORING THE OPERATIVENESS OF CURRENT-CONSUMING ELECTRICAL DEVICES

[76] Inventor: Konstantin Zarkadas, Am Lindenplatz 5, 3014 Laatzen, Germany

[21] Appl. No.: 682,912

[22] Filed: May 3, 1976

[30] Foreign Application Priority Data

May 2, 1975 Germany .............. 2519725

[51] Int. Cl.² ............... B60Q 1/26; G08B 21/00
[52] U.S. Cl. .................................... 340/79; 340/251
[58] Field of Search ..................... 340/79, 251

[56] References Cited

U.S. PATENT DOCUMENTS

| 3,546,687 | 12/1970 | Rojek et al. | 340/251 |
|---|---|---|---|
| 3,728,705 | 4/1973 | Atkins | 340/251 |
| 3,852,733 | 12/1974 | Sakuri | 340/251 |
| 3,898,513 | 8/1975 | Kopernik et al. | 340/251 |
| 3,952,229 | 4/1976 | Rekow | 340/251 |
| 3,956,733 | 5/1976 | Sakuri | 340/79 |
| 3,965,456 | 6/1976 | Schwellenbach | 340/79 |

FOREIGN PATENT DOCUMENTS

| 2,342,153 | 2/1975 | Germany | 340/79 |
|---|---|---|---|
| 1,109,049 | 1/1962 | Germany | 340/79 |
| 1,455,559 | 4/1969 | Germany | 340/79 |

Primary Examiner—Donald J. Yusko
Attorney, Agent, or Firm—Michael J. Striker

[57] ABSTRACT

The monitoring circuit includes an indicator operative when activated for providing an indication. A control circuit is operative for activating the indicator when proper current ceases flowing in the current path of the monitored electrical device. The control circuit includes a reed switch connecting the indicator to the current path of the monitored electrical device and operative for controlling the activation of the indicator. An inductive component is connected in the current path of the monitored electrical device and generates a magnetic field which controls the operation of the reed switch in dependence upon the flow of current through the current path of the monitored electrical device.

9 Claims, 5 Drawing Figures

CIRCUIT FOR MONITORING THE OPERATIVENESS OF CURRENT-CONSUMING ELECTRICAL DEVICES

BACKGROUND OF THE INVENTION

The invention relates to monitoring arrangements for monitoring the operativeness of electrical devices.

Circuits are known for monitoring the operativeness of, for example, the tail lights of an automotove vehicle. In one known construction, use is made of ordinary relays. With ordinary relays, the difference between their pull-in and drop-out characteristics is relatively great, and it worsens over prolonged periods of use. A further disadvantage of the known construction is that circuits of that type do not provide an indication of the failure of a safety fuse. Also, such ordinary relays, because of their moving parts, are sensitive to moisture, temperature, dust and vibration. Additionally, the relatively large number of turns in the windings of such relays result in an undesirably large voltage drop.

Other monitoring circuits incorporate light-conducting cables. However, the installation of such cables is expensive. Also of disadvantage is the fact that the optical indicator of the monitoring arrangement remains illuminated for as long as the monitored electrical device is in order. This has proved to be of disadvantage in particular in the case of monitoring arrangements provided in automotive vehicles.

SUMMARY OF THE INVENTION

It is a general object of the invention to provide a monitoring circuit, especially well adapted for use in automotive vehicles, operative for monitoring the operation of an electrical device, with the monitoring circuit not exhibiting the disadvantages discussed above, but instead being unsusceptible to malfunction, of simple construction, and easy to install.

This object can for example be achieved by utilizing a reed switch (inert-gas switch) as part of a means for generating a control voltage, with the reed switch being surrounded by a coil connected in the current path of the electrical device being monitored. One terminal of the reed switch is advantageously connected to the current path for the electrical device being monitored, while the other terminal of the reed switch is connected to an indicator light, either directly or through the intermediary of a switching element.

An inert-gas switch (reed switch) does not include any moving parts (except for the encapsulated reeds) and is accordingly insensitive to moisture, temperature, dust and vibration.

Another advantage of the inventive circuit expedient resides in the fact that the coil which surrounds the reed switch can be composed of only a few turns. This results in a voltage drop which is considerably lower than the voltage drop which would be associated with an ordinary relay. Additionally, the turns of the single-layer coil can be made of relatively thick wire. This facilitates adjustment of the monitoring circuit, which can be performed by simply short-circuiting one or more turns of the coil.

A further advantage of the inventive circuit expedient is that the reliability with which the reed switches employed operate is independent of where they are located.

Also, the inventive monitoring circuits are of inherently compact construction and accordingly can be readily installed into existing set-ups, e.g. as an afterthought.

In contrast to the known monitoring circuits, with the disclosed monitoring circuit the indicator light becomes illuminated even when the operating voltage drops considerably, for example as a result of a drop in the battery voltage or as a result of faulty contacts in the current path leading from the battery. Also, the indicator light provides an indication of when the safety fuse associated with one of the monitored electrical devices fails.

A still further advantage afforded by the disclosed circuits is that the read switches employed therein have a virtually unlimited useful lifetime. Indeed, even if one of the reed switches fails, this is not of disadvantage per se for the proper functioning of the electrical device or devices being monitored.

In one advantageous embodiment, one contact of the reed switch is connected to the current path for the electrical device being monitored while the other contact of the reed switch is connected to the indicator light. The reed switch is positioned adjacent to a permanent magnet. The coil surrounding the reed switch is connected directly in the current path of the monitored electrical device. When the current in that current path is of proper value, the magnetic field emanating from the coil overcompensates the field emanating from the permanent magnet.

In another embodiment, use can be made of a double-throw reed switch, the middle contact of which is connected to the current path of the electrical device, with one of its stationary contacts being connected to the indicator light.

In another embodiment, a monitoring circuit monitors the operation of two electrical device which have equal current consumptions. The coil whicn surrounds the reed switch is subdivided into two subcoils. Each subcoil is connected in the current path of a respective one of the two monitored electrical devices. The two subcoils are so wound that the magnetic fields emanating from them cancel each other out when proper current flows through the current paths of both monitored electrical devices. One contact of the reed switch is connected to the shared portion of the current paths of the two electrical devices, while the other contact of the reed switch is connected to the indicator light.

Instead of being directly connected, the reed switch can be connected to the indicator light via a switching element controllable through the intermediary of a diode. The switching element is connected on the one hand to the indicator light and on the other hand via the diode to that one of the reed-switch contacts which is connected to the shared portion of the current paths of the two monitored electrical devices. The switching element can be for example a transistor with an associated biasing resistor, or a thyristor.

In order to be able to easily check the operativeness of the monitoring circuit, a test voltage can be applied via a biasing resistor and a diode to the control input of the switching element. If the monitoring circuit is to be used in an automotive vehicle, then it is advantageous to connect the control input of the electronic part of the monitoring circuit to the starter switch for the starting motor of the vehicle engine. In that way, when the starter switch closes during engine start-up, the indicator lamp will light up briefly to indicate, not the operativeness of the various monitored electrical devices, but instead the operativeness of the monitoring circuit itself.

Thus, a double-check is achieved without the need for any additional operations on the part of the drive of the vehicle.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
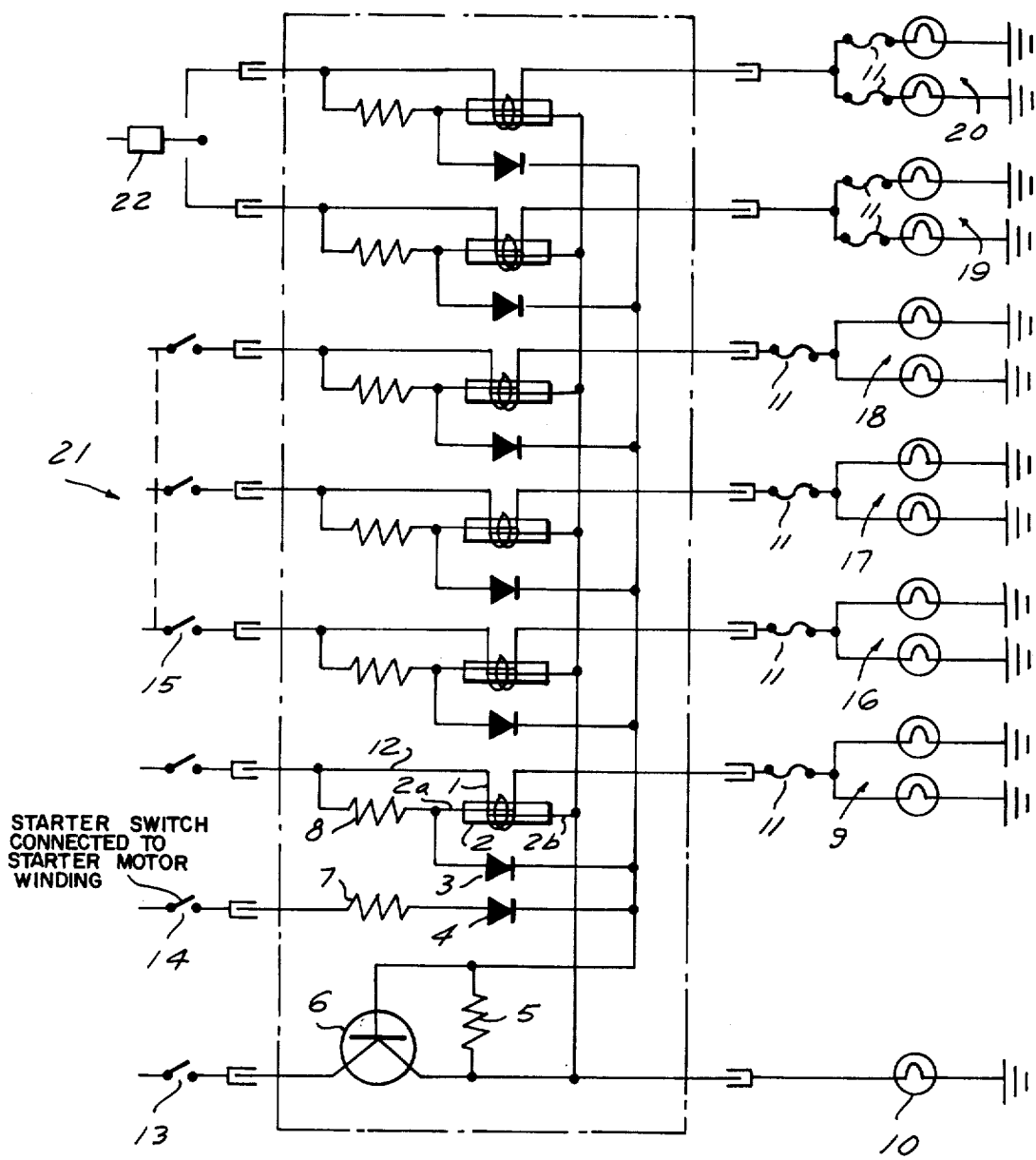
FIG. 1 depicts a monitoring circuit operative for monitoring six electrical devices, the circuit being provided with a transistor as the electronic switching element.

The monitoring circuit of FIG. 1 includes a plurality of stages each including a respective reed switch. The reed switch denoted by numeral 2 is encircled by a coil 1 connected in the current path 12 of the electrical device 9 whose operativeness is to be monitored. One contact 2a of the reed switch 2 is connected to the current path 12 of the electrical device 9 to be monitored. The other contact 2b of the reed switch 2 is connected to an indicator light 10. The monitoring circuit furthermore includes an electronic switching element 5, 6 controllable through the intermediary of a diode 3, the switching element here being in the form of a simple transistor circuit. The collector-emitter path of the transistor 6 is connected in the current path of the indicator light 10, while its base is connected via diode 3 to the contact 2a of the reed switch 2, the latter contact being connected to the current path 12 of the monitored electrical device 9. Also connected in the current path of the indicator light 10 is the ignition switch 13 of an automotive vehicle.

The operativeness of the electronic switching element 5, 6 and of the indicator lamp 10 is automatically checked when the vehicle engine is started up. When the start switch 14 of the starting motor of the engine is briefly closed during engine start-up, a test voltage is automatically applied via a biasing resistor and a diode 4 to the base of transistor 6. If desired, an independent switch could be provided activatable by the driver of the vehicle for checking the operativeness of the switching element 5, 6 and the indicator light 10, not only during start-up, but whenever desired.

In the circuit arrangement of FIG. 1, the operativeness of six electrical devices 9 and 16–20 is monitored, with these electrical devices being provided with safety fuses 11. For example electrical device 9 is comprised of the braking lights of the vehicle, with a braking switch 15 being connected in the current path 12 of the device 9. Device 16 is comprised of the license-plate lights, device 17 the right-hand tail light and parking light, device 18 the left-hand tail light and parking light, device 19 the brights, and device 20 the dims. Electrical devices 16, 17 and 18 are connected to a switch 21 constituting the first stage of a combination switch. The devices 19 and 20 are connected to a combination relay 22.

Figure 2:
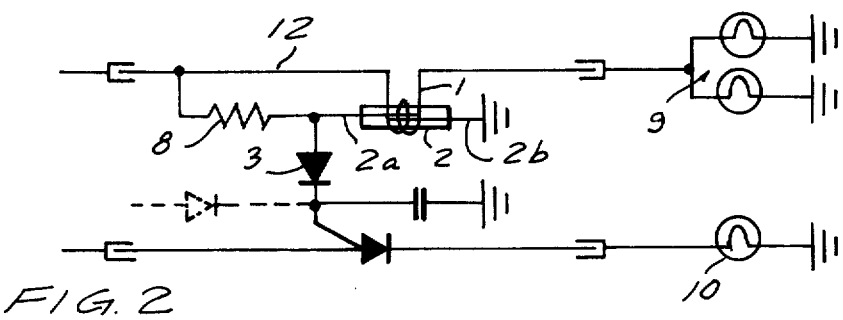
FIG. 2 depicts a monitoring circuit utilizing a thyristor instead of a transistor.

In the circuits of both FIGS. 1 and 2, the contact 2a of the reed switch 2 is connected to the current path 12 of the electrical device being monitored through the intermediary of a biasing resistor 8.

The magnetic field resulting from the flow of load current through the coil 1 closes the reed switch 2 if the load current is at its rated value. In such event, the control voltage applied to switch element 5, 6 is zero so that the indicator light 10 will not light up. If one of the bulbs in for example device 9 burns out, i.e. if device 9 becomes partly inoperative, then there will be a corresponding decrease in the strength of the magnetic field of coil 1, and the reed switch 2 will open. When reed switch 2 opens, a forward-bias voltage will be applied via biasing resistor 8 and diode 3 to the electronic switch element, 5, 6, so that indicator light 10 will light up.

Checking of the operativeness of the switch element 5, 6 and of the indicator light 10 is accomplished by applying a test voltage to the switch element. For example the base-emitter path of transistor 6 can be connected across the winding of the starting motor so that when the starting motor is operative the indicator light if operative will light up; alternatively, the base-emitter path of transistor 6 can be connected to a separate manually activatable switch which is activated by the vehicle driver whenever he wishes to check the operativeness of the switching element 5, 6 and of the indicator light 10.

FIG. 2 depicts a modification of the monitoring circuit of FIG. 1, wherein the transistor switch element 5, 6 is replaced by a thyristor (SCR) 23.

Figure 3:
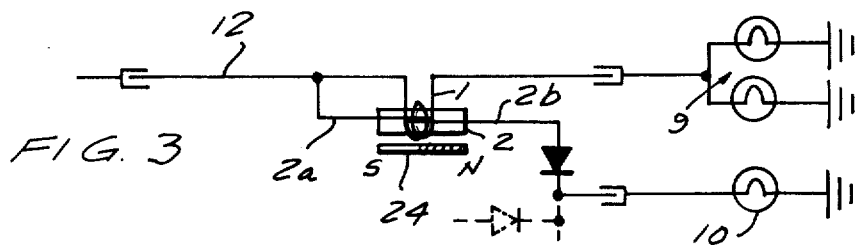
FIG. 3 depicts a monitoring circuit making use of a permanent magnet cooperating with the reed switch.

In the embodiment of FIG. 3, a permanent magnet 24 is arranged alongside the reed switch 2. As before, the coil 1 surrounding the reed switch 2 is connected in the current path 12 of the monitored electrical device 9. If the current in path 12 is the rated current for device 9, then the electromagnetic field produced by coil 1 overcompensates the magnetic field produced by magnet 24, with the reed switch 2 accordingly remaining open. If the current in the current path 12 of the monitored device 9 decreases or ceases to flow altogether, then the magnetic field of permanent magnet 24 predominates, the reed switch 2 closes, and the indicator light 10 lights up.

Figure 4:
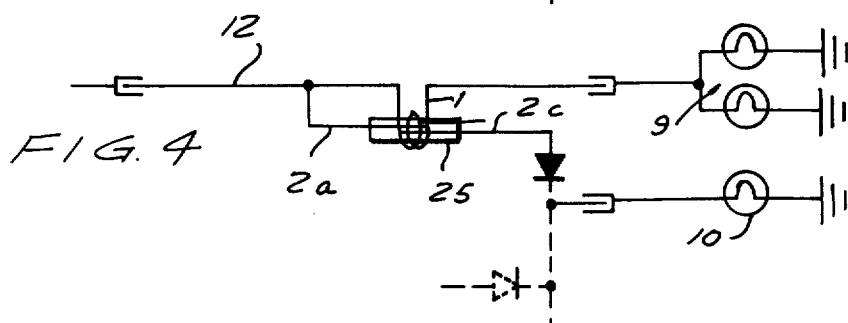
FIG. 4 depicts the circuit of FIG. 3 but using a double-throw reed switch.

FIG. 4 depicts a modification of the monitoring circuit, wherein the simple reed switch is replaced by a double-throw reed switch, i.e. a reed switch having two stationary contacts and an intermediate moving contact which moves into engagement with one or the other of the stationary contacts. The double-throw reed switch is here used essentially as a normally closed switch. Its function includes that performed by permanent magnet 24 in the modification of FIG. 3; i.e., the switch remains closed so long as the proper load current flows through coil 1. Specifically, if rated load current flows through coil 1, the moving contact of switch 25 moves from the rest contact position to the work contact position, so that no current flows through the indicator light 10. If the load current decreases to flow altogether, then the moving contact of the reed switch comes into engagement with its rest contact 2c, as a result of which indicator light 10 lights up.

Figure 5:
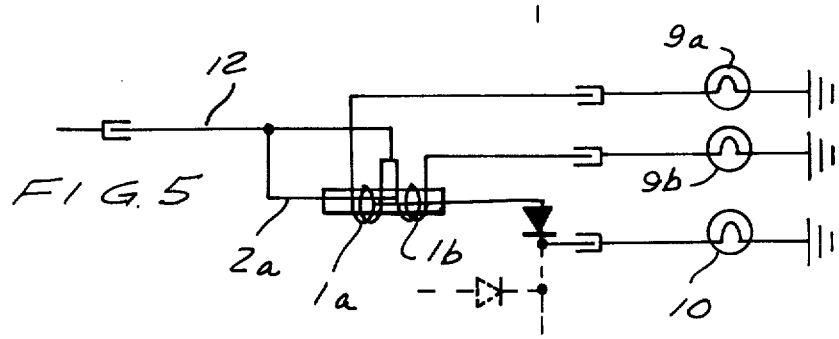
FIG. 5 depicts a monitoring arrangement in which the contacts of the reed switch are controlled by two coils associated with two different monitored electrical devices.

FIG. 5 depicts a modification of the monitoring circuit according to which two electrical devices 9a, 9b having the same current consumption are associated with a single reed switch. The coil 1 surrounding the reed switch is subdivided into two subcoils 1a, 1b, each being connected in the current path of a respective one of the two electrical devices 9a, 9b. The subcoils 1a, 1b are so wound that when rated load current flows through both of them the magnetic fields which they produce will substantially exactly cancel each other out, so that the reed switch will remain open. If one of the two electrical devices 9a, 9b burns out and ceases to draw current, then the magnetic field generated by the subcoil associated with the other of the two devices 9a, 9b will no longer be cancelled out, and the reed switch will close, so that indicator light 10 will light up.

It will be understood that each of the elements described above, or two or more together, may also find a useful application in other types of circuits and constructions differing from the types described above.

While the invention has been illustrated and described as embodied in monitoring circuits for monitoring the operativeness of electrical devices of an automotive vehicle, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an automotive vehicle provided with a starter motor having a starter motor winding and at least one current-consuming electrical device receiving current via a current path, a monitoring circuit for monitoring the operativeness of the at least one electrical device, comprising, in combination, indicating means operative when activated for providing an indication; control means operative for activating the indicating means when proper current ceases flowing in the current path of the monitored electrical device, the control means including an inert-gas reed switch and electronic switch means electrically connected to the inert-gas reed switch and controlled by the latter, the inert-gas reed switch and the electronic switch means connecting the indicating means to the current path of the monitored electrical device and being operative for controlling the activation of the indicating means, and inductance means connected in the current path of the monitored electrical device and operative for generating a magnetic field which controls the operation of the reed switch in dependence upon the flow of current through the current path of the monitored electrical device; and checking means for checking the operativeness of the monitoring circuit including means electrically connecting the electronic switch means to the starter motor winding for controlling the electronic switch means in response to start-up energization of the starter motor winding.

2. The combination defined in claim 1, the starter motor of the vehicle being provided with a starter switch, the means electrically connecting the electronic switch means to the starter motor winding including the starter switch and being operative for carrying starter switch current.

3. The combination defined in claim 1, the indicating means being comprised of an indicator light, the reed switch having one contact connected to the current path of the monitored electrical device and another contact connected to the indicator light, the control means further including permanent magnet means arranged to generate a magnetic field which if unopposed closes the reed switch, the inductance means comprising means operative when proper current is flowing through the current path of the monitored electrical device for generating a magnetic field which opposes the magnetic field generated by the permanent magnet means.

4. The combination defined in claim 1, the combination including at least two electrical devices of equal current consumption each receiving current via a respective current path, the two current paths having a shared portion, the reed switch connecting the shared portion of the current paths to the indicating means, the inductance means including two subcoils each connected in a respective one of the two current paths, the two subcoils being so wound that when proper current is flowing in both the current paths the magnetic fields produced by the subcoils oppose each other.

5. The combination defined in claim 1, the reed switch having one contact connected to the current path of the monitored electrical device and another contact connected to the indicating means, the control means furthermore including a diode, the diode having one terminal connected to the one contact of the reed switch and having another terminal, the electronic switch means being connected between the other terminal of the diode and the indicating means and being controllable via the diode.

6. The combination defined in claim 5, the electronic switch means being comprised of a transistor and a biasing resistor connected thereto.

7. The combination defined in claim 5, the electronic switch means being comprised of a thyristor.

8. The combination defined in claim 1, the checking means constituting means operative when activated for checking the operativeness of the electronic switch means and the indicating means by applying a test voltage to the electronic switch means.

9. The combination defined in claim 8, the checking means comprising means for applying the test voltage to the electronic switch means through the intermediary of a diode and a biasing resistor.

* * * * *